United States Patent [19]

Memmola

[11] Patent Number: 4,933,610

[45] Date of Patent: Jun. 12, 1990

[54] DEVICE FOR AUTOMATICALLY CLOSING A POWER ROOF OF A VEHICLE

[75] Inventor: Serafino Memmola, Varese, Italy

[73] Assignee: Delta Elettronica S.p.A., Varese, Italy

[21] Appl. No.: 211,368

[22] Filed: Jun. 24, 1988

[30] Foreign Application Priority Data

Jul. 2, 1987 [IT] Italy .................. 60923/87[U]

[51] Int. Cl.$^5$ .............................................. H02P 1/22
[52] U.S. Cl. ................................... 318/282; 318/283; 307/10.1
[58] Field of Search ........ 318/282, 286, 283, 467–469, 318/474, 567–569, 563; 340/541, 545, 426, 63, 542; 307/10.1–10.7

[56] References Cited

U.S. PATENT DOCUMENTS

| | | | |
|---|---|---|---|
| 4,464,651 | 8/1984 | Duhame | 318/565 X |
| 4,480,249 | 10/1984 | Heidman, Jr. | 340/426 |
| 4,536,687 | 8/1985 | Kurihara et al. | 318/478 X |
| 4,634,945 | 1/1987 | Takemura et al. | 318/469 |
| 4,644,235 | 2/1987 | Ohta | 318/282 |

*Primary Examiner*—William M. Shoop, Jr.
*Assistant Examiner*—A. Jonathan Wysocki
*Attorney, Agent, or Firm*—Peter K. Kontler

[57] ABSTRACT

A motor vehicle has a power roof which can either rotate between a first open position and a closed position or translate between a second open position and the closed position. An electric motor for opening and closing the roof operates from a battery of the vehicle and is connected to the battery by a circuit which can be closed by either of two switches. When the roof is closed, activation of one switch causes the roof to open by rotation while activation of the other switch causes the the roof to open by translation. When the the roof is in an open position, activation of the switch other than that which caused the roof to assume such position effects closing of the roof. The vehicle is equipped with a security system which also operates from the battery and, upon activation, sends a signal to the circuit connecting the motor to the battery. In response to this signal, the circuit issues a short first pulse, a second pulse which is at least as long as the first pulse, a short third pulse, and a fourth and final pulse which is at least as long as the third pulse. The first and fourth pulses activate one of the switches while the second and third pulses activate the other switch. This causes the roof to close completely regardless of the position of the roof at the time the security system is activated.

24 Claims, 2 Drawing Sheets

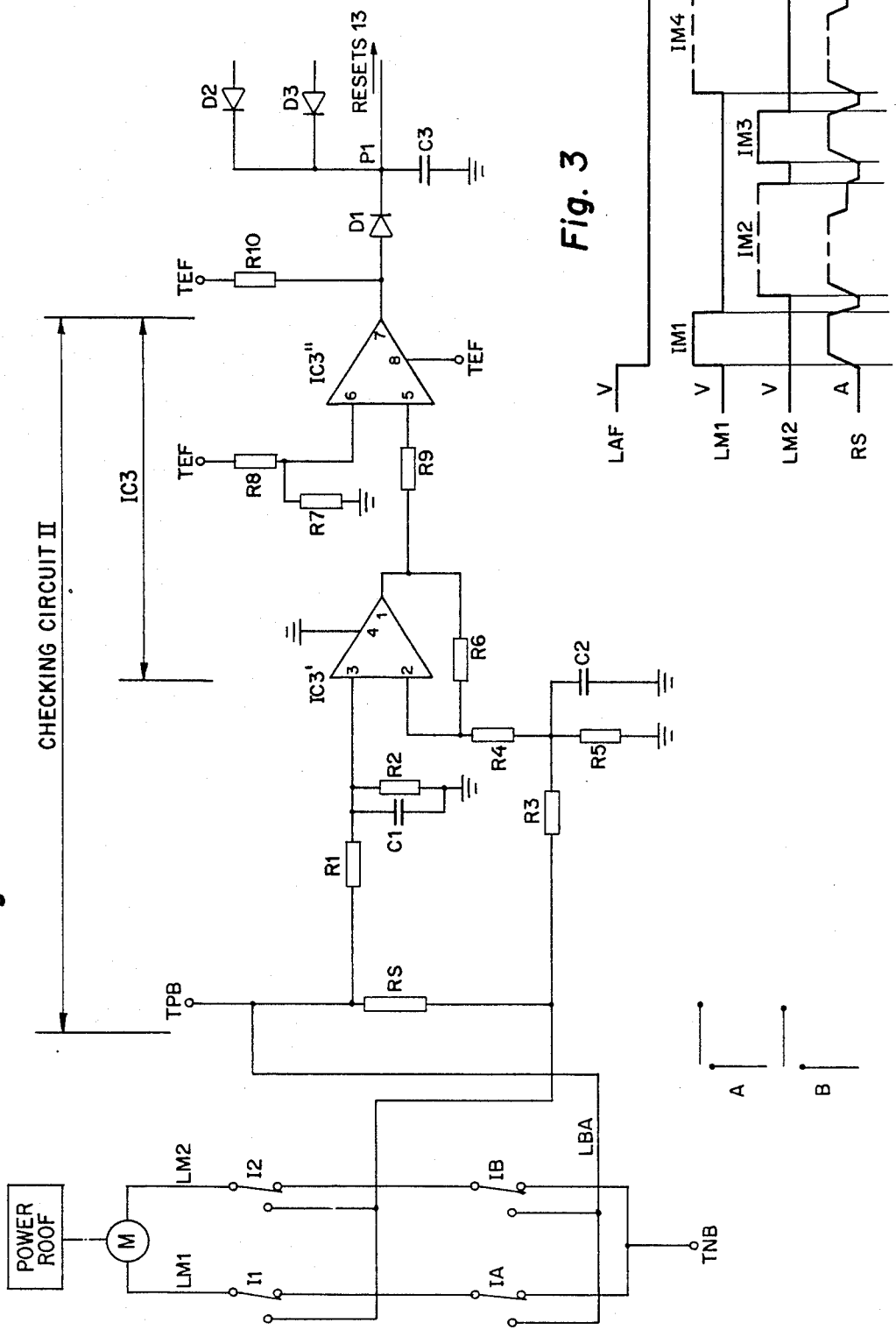

DEVICE FOR AUTOMATICALLY CLOSING A POWER ROOF OF A VEHICLE

BACKGROUND OF THE INVENTION

The invention relates generally to a vehicle, such as a motor vehicle, having a power roof.

More particularly, the invention relates to a device for automatically closing the power roof of a vehicle when the occupant or occupants exit the vehicle.

It is known to provide a vehicle with a roof which can be opened and closed. The roof can be designed for manual operation or for operation by means of an electric motor. Moreover, the roof can be constructed so that opening and closing take place solely by substantially horizontal translation of the roof or, alternatively, so that opening and closing can be performed either by substantially horizontal translation or by rotation of the roof. In the latter case, the roof is inclined to the horizontal in the open position.

Electrically actuated or power roofs which can open and close horizontally only are controlled by two keys. One of these keys functions to open the roof while the other functions to close the roof. The keys operate a control element which can be linearly or angularly displaced between an inoperative position and two operative positions, namely, an operative position in which the roof is caused to open and an operative position in which the roof is caused to close.

Power roofs which can open and close both horizontally and rotationally are controlled by either four keys or two keys. If four keys are employed, two serve to respectively open and close the roof horizontally and two serve to respectively open and close the roof rotationally. On the other hand, when two keys are used, the function of each key depends upon the position of the roof, that is, whether the roof is closed, horizontally open or rotationally open. When the roof is closed, one of the keys functions to open the roof horizontally and one of the keys functions to open the roof rotationally. On the other hand, if the roof is open horizontally, either partially or fully, the key used for horizontal opening retains this function while the other key now becomes operative to close the roof horizontally. The two keys keep these functions until the roof is closed. Finally, when the roof is partially or fully open rotationally, the key serving for rotational opening retains this function whereas the other key operates for rotational closing of the roof. Again, the keys retain such functions until the roof is closed. Thus, the function of one key is changed upon opening the roof and also upon closing the roof. Upon opening, the key other than that which was used to open the roof undergoes a change in function whereas, upon closing, the key which closed the roof undergoes a change in function.

All roofs exhibit the drawback that the roof will remain open if the occupant or occupants forget to close the roof when leaving the vehicle.

This drawback cannot be eliminated for manually operated roofs. On the other hand, such drawback has been overcome for power roofs of the type where each operation is controlled by a separate key, i.e., power roofs of the type where horizontal opening is controlled by a first key, horizontal closing by a second key and, if the roof opens rotationally, where rotational opening is controlled by a third key and rotational closing by a fourth key. Reference may be had, for example, to the Japanese publication JP-A-60 71 330 dated Apr. 23, 1985.

In order to automate closing of a power roof where each operation is controlled by a separate key, it is sufficient to provide a means for automatically detecting the position of the roof and a means for connecting the key which controls closing of the roof from such position to the vehicle battery. However, this arrangement is not suitable for a power roof which opens both horizontally and rotationally and is controlled by only two keys so that more than one operation is performed by a single key.

OBJECTS AND SUMMARY OF THE INVENTION

It is an object of the invention to provide a device which allows closing of a power roof to be automated even though one key or switch controls different movements of the roof.

Another object of the invention is to provide a method of automatically closing a power roof which is designed to perform a plurality of different movements under the action of a single key or switch.

An additional object of the invention is to provide a device capable of automatically closing a power roof which opens both horizontally and rotationally and is controlled by only two keys each of which causes the roof to perform different movements depending upon the position of the roof.

The preceding objects, as well as others which will become apparent as the description proceeds, are achieved by the invention.

One aspect of the invention resides in a vehicle, particularly a motor vehicle, comprising a power roof having a closed position, a first open position in which the roof is translated from the closed position and a second open position in which the roof is rotated from the closed position. An electric motor is provided to move the roof between its various positions, and is a source of electricity is provided for the motor. The vehicle further comprises means for securing the same against theft, and the securing means has an operative condition and an inoperative condition. Means is provided for connecting the motor to the source of electricity and includes circuit means coupled to the motor and the source, first switch means for closing the circuit means and second switch means for closing the circuit means. The motor is designed to translate the roof towards the first open position when the first switch means is closed while the roof is in its closed position; to rotate the roof towards the closed position when the first switch means is closed while the roof is in its second open position; to rotate the roof towards the second open position when the second switch means is closed while the roof is in its closed position; and to translate the roof towards the closed position when the second switch means is closed while the roof is in its first open position. The circuit means is operable to actuate the switch means in response to a change from the inoperative to the operative condition of the securing means so that the motor locks the roof in the closed position. Preferably, the circuit means comprises an electronic circuit.

The vehicle may further include a first manually operable key or button and a second manually operable key or button. The first button may control a switch constituting part of the first switch means while the second button may control a switch constituting part of the second switch means.

The circuit means may comprise an electronic control circuit which, upon activation of the securing means or security system, emits a sequence of control pulses. These control pulses actuate the switch means such that the roof performs one or more movements which cause the roof to assume its closed position regardless of the position of the roof when the security system was activated.

According to one embodiment of the invention, the control circuit is designed to generate a sequence of four control pulses upon activation of the security system. Each of the switch means is here actuated by two of the control pulses. Preferably, the first pulse of the sequence is short, the second equally long or longer, the third short like the first and the fourth again at least as long as the first and third. The first and fourth pulses then actuate one of the switch means while the second and third pulses actuate the other of the switch means.

The roof has a terminal first open position which corresponds to the fully open translational position of the roof and a terminal second open position which corresponds to the fully open rotational position of the roof. The circuit means may further comprise a checking circuit which is designed to interrupt the second and fourth pulses issued by the control circuit when the roof assumes its closed position or either of its terminal open positions.

It is immaterial for the operation of the device of the invention whether the first and fourth pulses actuate the first switch means or the second switch means. The same applies for the second and third pulses.

According to another embodiment of the invention, the control circuit includes first, second, third and fourth control modules. The first module has a first input which is connected to the security system, and a pair of first outputs. The circuit means may comprise a first relay for closing one of the switch means and one of the first outputs is then connected to the first relay. The second module has a second input and a pair of second outputs, and the second input is connected to the other of the first outputs. The circuit means may additionally comprise a second relay for closing the other of the switch means and one of the second outputs is here connected to the second relay. The third module has a third input and a pair of third outputs, and the third input is connected to the other of the second outputs. One of the third outputs is connected to the second relay. The fourth module has a fourth input which is connected to the other of the third outputs and a fourth output which is connected to the first relay.

The second and fourth modules may each be provided with an additional input which is connected to the checking circuit.

The motor which operates the roof may be designed to draw current in excess of a predetermined value during travel of the roof between its closed position and either of its terminal open positions. The motor may further be designed to draw current no higher than the predetermined value when the roof assumes the closed position or either terminal open position. The checking circuit may be arranged to monitor the current drawn by the motor and to generate an operating signal as long as the current exceeds the predetermined value. When the current drops to the predetermined value, the operating signal is terminated.

Upon activation of the security system, the latter sends an activating signal to the first module of the control circuit. In response to the activating signal, that output of the first module which is connected to the first relay emits a short first pulse which causes the motor to operate for a short period. The other output of the first module sends an output signal to the second module thereby causing that output of the second module which is connected to the second relay to issue a second pulse at least as long as the first pulse. The second pulse again causes the motor to operate and, since the motor then draws current in excess of the predetermined value, the checking circuit sends an activating signal to the second module. Due to the activating signal, the second module continues to generate a pulse until the roof reaches its closed position or one of its terminal open positions. The current drawn by the motor now drops to or below the predetermined value. As a result, the activating signal of the checking circuit is terminated and the pulse emitted by the second module is interrupted.

The output of the second module which is connected to the third module transmits an output signal to the third module in response to the signal from the first module. Consequently, that output of the third module which is connected to the second relay issues a short third pulse which causes the motor to operate for a short period. The other output of the third module sends an output signal to the fourth module so that the latter generates a fourth pulse which is at least as long as the third pulse and once more sets the motor in operation. As before, operation of the motor causes the checking circuit to generate an activating signal because the current drawn by the motor exceeds the predetermined value. This activating signal is transmitted to the fourth module to thereby maintain the pulse emitted by such module. When the roof reaches the end of its travel, the current drawn by the motor drops to or below the predetermined value. The activating signal, and hence the output pulse of the fourth module, are thus terminated.

The pulses generated by the second and fourth modules preferably have a maximum possible duration at least equal to the time required for the roof to travel between its closed position and either of its terminal open positions.

The circuit means may include means for spacing consecutive pulses, that is, for delaying the start of the second, third and fourth pulses beyond the end of the preceding pulse.

The security system which initiates automatic closing of the roof may comprise an alarm. Alternatively, the security system may comprise means for locking the doors of the vehicle and the activating signal which is responsible for causing the roof to close automatically may then be directly or indirectly initiated by a central control element of the locking means. It is further possible for the security system to comprise means for locking the ignition mechanism and, in such an event, the activating signal may be directly or indirectly generated upon removal of the ignition key from the mechanism.

The novel features which are considered as characteristic of the invention are set forth in particular in the appended claims. The improved roof closing device itself, however, both as to its construction and its mode of operation, together with additional features and advantages thereof, will be best understood upon perusal of the following detailed description of certain specific

BRIEF DESCRIPTION OF THE DRAWING

FIG. 2 illustrates another portion of the circuitry; and

FIG. 3 illustrates plots of voltages and current generated in the device of FIGS. 1 and 2.

DESCRIPTION OF PREFERRED EMBODIMENTS

Figure 1:
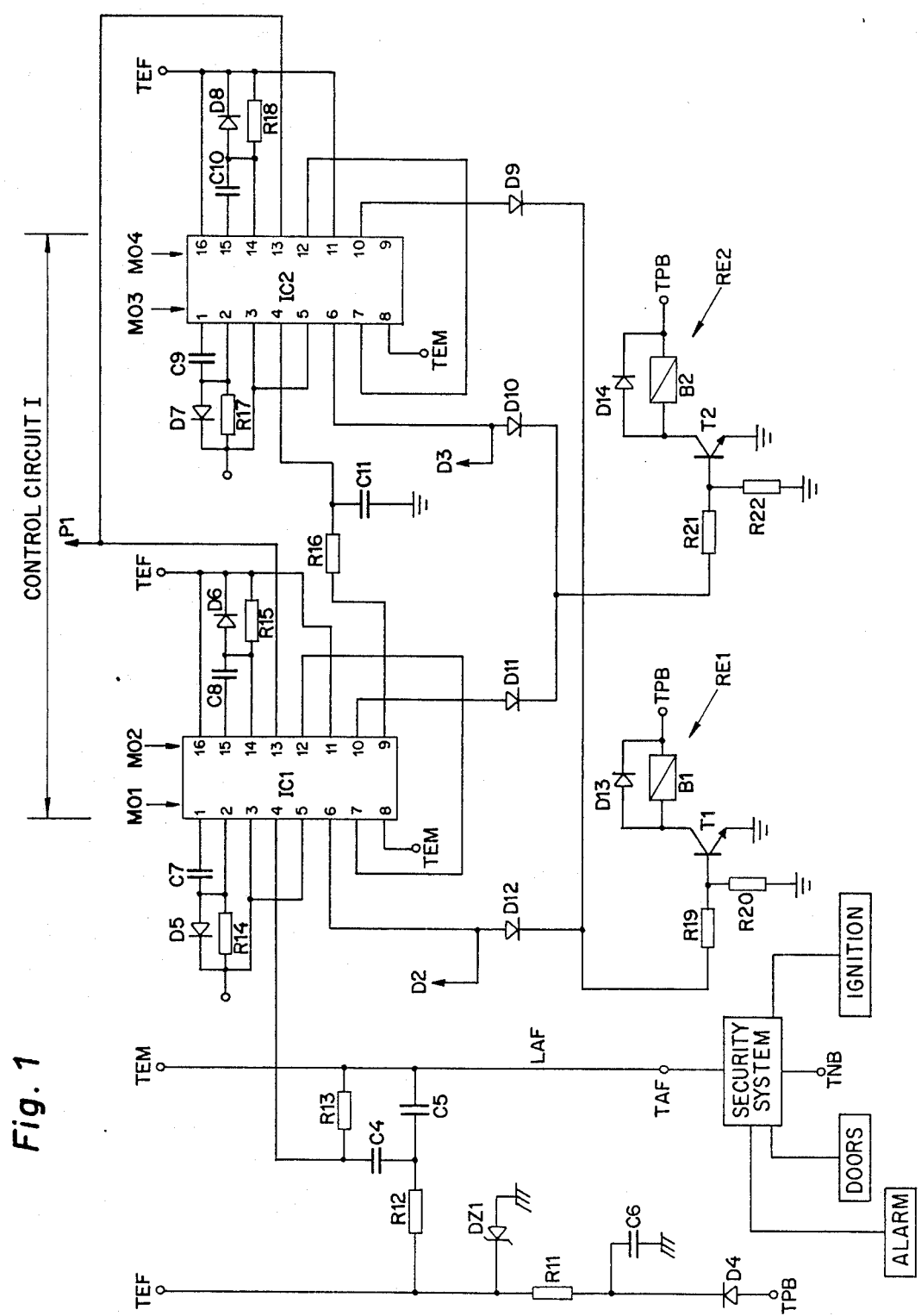
FIG. 1 illustrates a portion of the circuitry constituting part of a device according to the invention for automatically closing a power roof of a vehicle.

FIGS. 1 and 2 illustrate circuitry constituting part of a device according to the invention for automatically closing a power roof of a vehicle in the event that the occupant or occupants neglect to close the roof upon leaving the vehicle. The vehicle is here assumed to be a motor vehicle.

The power roof is of the type which can open in either of two ways. Thus, the roof can move from its closed position to a first open position by translation. Translation of the roof between the closed position and the first open position may take place along a generally horizontal path. The roof can also move from its closed position to a second open position by rotation or pivoting.

The roof is movable between the closed position and the two open positions by a reversible electric motor M. The motor M is controlled by two manually operable buttons or keys A and B which respectively actuate switches IA and IB.

Two supply lines LM1 and LM2 are connected to the motor M. The switch IA is associated with the supply line LM1 while the switch IB is associated with the supply line LM2. In the illustrated rest positions of the switches IA and IB, each of the supply lines LM1 and LM2 is connected to the negative terminal TNB of a battery for the vehicle and the motor M is idle.

When the key A is depressed, it moves the switch IA so as to connect the supply line LM1 to a lead LBA coming from the positive terminal TPB of the vehicle battery. The battery may, for example, be a 12 volt battery. As a consequence, the motor M begins to run in a first direction and continues running as long as the key A remains depressed. Once the key A is released, the switch IA moves back to its initial position in which the supply line LM1 connects the motor M to negative. The motor M then stops running.

Similarly, when the key B is depressed, the switch IB moves so as to connect the supply line LM2 to the lead LBA. Current again flows into the motor M but in a direction opposite to that when the key A is depressed. As a result, the motor M runs in a direction counter to the direction during depression of the key A.

The effect of actuating the keys A and B differs depending upon the position of the roof at the time of actuation. If the roof is closed, the key A will cause the roof to open by rotation while the key B will cause the roof to open by translation. On the other hand, if the roof is partially or fully translated from its closed position, the key B retains its function of opening the roof by translation but the function of the key A is changed so that it now serves to close the roof by translation. The key A retains this new function until such time as the roof has been fully closed once more. Finally, if the roof is partially or fully rotated from its closed position, the key A retains its function of opening the roof by rotation whereas the key B assumes the new function of causing the roof to close by rotation. Again, the key B retains its new function until the roof is returned to the fully closed position.

The element which changes the functions of the keys A and B operates on the output side of the motor M as the latter always runs in a given direction when actuated by the key A and always runs in the opposite direction when actuated by the key B. This element is not described here since it does not form part of the invention per se and the structure and operation thereof have no bearing on the structure and operation of the device in accordance with the invention.

The device according to the invention for automatically closing the roof includes an electronic control circuit I and an electronic checking circuit II. Both the control circuit I and the checking circuit II are coupled to positive by means of a terminal TEF which is connected to the positive terminal TPB of the vehicle battery via a filtering unit including a diode D4, a grounded capacitor C6, a resistor R11 and a grounded Zener diode DZ1. By way of example, the diode D4 may be of the type designated IN4004; the capacitor C6 may have a capacitance of 47 microfarads; the resistor R11 may have a resistance of 47 ohms; and the Zener diode DZ1 may have a rating of 15 volts. The control circuit I and checking circuit II are further coupled to a terminal TEM which is connected to the negative terminal TNB of the vehicle battery through a conductor LAF and a security system for the vehicle. The security system is connected to a terminal TAF of the conductor LAF. The terminal TEM goes negative when the security system is brought into an operative condition and remains negative as long as the security system is in such condition.

The security system may comprise an alarm; means for locking the doors of the vehicle; and/or means for locking the ignition mechanism, and thereby the steering unit, of the vehicle.

The control circuit I comprises two integrated circuits IC1 and IC2 which may, for example, be constituted by dual monostable multivibrators MC14528B of Motorola. The integrated circuit IC1 includes a first circuit module MO1 having connectors or pins 1,2,3,4,5,6,7,8 and a second circuit module MO2 having connectors or pins 9,10,11,12,13,14,15,16. Similarly, the integrated circuit IC2 includes a third circuit module MO3 having connectors or pins 1,2,3,4,5,6,7,8 and a fourth circuit module MO4 having connectors or pins 9,10,11,12,13,14,15,16.

The first and fourth modules MO1 and MO4 control a first relay RE1 comprising a coil B1 while the second and third modules MO2 and MO3 control a second relay RE2 comprising a coil B2. The relay RE1 functions to actuate a switch I1 which is associated with the supply line LM1 for the motor M and is connected in series with the switch IA between the latter and the motor M. On the other hand, the relay RE2 functions to actuate a switch I2 associated with the supply line LM2 for the motor M and connected in series with the switch IB between such switch and the motor M. In the illustrated rest positions, the switches I1 and I2 connect the supply lines LM1 and LM2 to the respective switches IA and IB. When the switches I1 and I2 are actuated by the respective relays RE1 and RE2, the switches I1 and I2 move to positions in which they connect the corresponding supply lines LM1 and LM2 to a conductor LSB coupled to the positive terminal TPB of the vehicle battery via a shunt resistor RS. The resistor RS may, for instance, have a resistance of 0.2 ohm.

The checking circuit II comprises an integrated circuit IC3 having two operational amplifiers IC3' and IC3''. The checking circuit II further comprises the shunt resistor RS which is disposed in the conductor LSB leading from the positive terminal TPB of the vehicle battery to the positive terminals of the switches I1 and I2. The conductor LSB has a branch between the positive terminal TPB and the shunt resistor RS. This branch, which includes a resistor R1 and a grounded unit made up of a second resistor R2 in parallel with a capacitor C1, connects the conductor LSB to a positive input 3 of the amplifier IC3'. The conductor LSB has another branch between the shunt resistor RS and the positive terminals of the switches I1 and I2. The latter branch, which establishes a connection between the conductor LSB and a negative input 2 of the amplifier IC3', comprises a pair of resistors R3 and R4 arranged in series, a grounded resistor R5 connected in parallel with a grounded capacitor C2, and a feedback resistor R6. By way of example, the resistor R1 may have a resistance of 100 kilohms; the resistors R2, R3 and R5 may have a resistance of 100 ohms; the resistors R4 and R6 may have a resistance of 1 megohm; and the capacitors C1 and C2 may have a capacitance of 0.1 microfarad.

The amplifier IC3' has a pin or connector 4 which is connected to ground and functions as negative for the integrated circuit IC3.

The amplifier IC3' further has an output 1 which is connected to the feedback resistor R6 and, via a resistor R9, to a positive input 5 of the amplifier IC3'. The amplifier IC3', which serves as a comparator, has a negative input 6 which is kept at a fixed reference voltage, e.g., 7 volts, through the agency of a grounded resistor R7 and a resistor R8 connected to the positive terminal TEF. The resistors R7, R8 and R9 may, for instance, have resistances of 68 kilohms, 100 kilohms and 100 kilohms, respectively.

The amplifier IC3' is additionally provided with a connector 8 which is coupled to the positive terminal TEF and functions as positive for the integrated circuit IC3.

The amplifier IC3' has an output 7 which is connected to the positive terminal TEF through a resistor R10. The output 7 is further coupled to the connectors 13 of the two integrated circuits IC1 and IC2 of the control circuit I by means of a diode D1. In addition, the output 7 of the amplifier IC3' is coupled to the connector 6 of the integrated circuit IC1 via a diode D2; to the connector 6 of the integrated circuit IC2 via a diode D3; and to ground via an electrolytic capacitor C3. The connectors 13 of the integrated circuits IC1 and IC2 constitute resets whereas the connectors 6 constitute positive outputs. By way of example, the resistor R10 may have a resistance of 10 kilohms; the capacitor C3 may have a capacitance of 47 microfarads; and the diodes D1, D2 and D3 may be of the type designated IN4148.

The connectors 8 of the two integrated circuits IC1 and IC2 of the control circuit I are directly coupled to the negative terminal TEM and function as negative for the respective integrated circuits IC1 and IC2. On the other hand, the connector 16 of each integrated circuit IC1 and IC2 is directly coupled to the positive terminal TEF and serves as positive for the respective integrated circuit IC1 or IC2.

The connector 4 of the first module MO1 forming part of the integrated circuit IC1 constitutes a negative input. This connector is coupled to the conductor LAF coming from the security system through an arrangement made up of a resistor R13 in parallel with two series-connected capacitors C4 and C5. A junction is provided between the capacitors C4 and C5 and is connected to the positive terminal TEF via a resistor R12. As an illustration, the resistors R12 and R13 may have respective resistances of 1 and 47 kilohms while the capacitors C4 and C5 may have respective capacitances of 10 and 1 microfarads.

The connector 1 of the first module MO1 is coupled to the positive terminal TEF by means of an arrangement which includes a diode D5 and a timing unit comprising a capacitor C7 and a resistor R14. The diode D5 and resistor R14 are disposed in parallel and the connector 2 of the first module MO1 is coupled to the positive terminal TEF through the diode D5, on the one hand, and the resistor R14, on the other hand. The connector 3 of the first module MO1, which constitutes a reset, and the connector 5 of the first module MO1, which constitutes a positive input, are both directly coupled to the positive terminal TEF and, accordingly, are always at a high potential. The connector 6 of the first module MO1 which, as already mentioned, constitutes a positive output, is connected to the reset 13 of the second module MO2 via a diode D2 and is further connected to the base of a transistor T1 by means of a diode D12 and a resistor R19. The base of the transistor T1 is grounded through a resistor R20. By way of example, the capacitor C7 may have a capacitance of 10 microfarads; the resistors R14, R19 and R20 may have resistances of 100, 1 and 10 kilohms, respectively; the diodes D2, D5 and D12 may respectively be of the types designated IN4148, IN4148 and IN4004; and the transistor T1 may be of the type designated PN 2222.

The emitter of the transistor T1 is connected to ground while the collector is connected to the negative terminal of the coil B1 forming part of the relay RE1 which controls the switch I1. The positive terminal of the coil B1 is connected to the positive terminal TPB of the vehicle battery. The relay RE1 which may, for instance, be constituted by a relay A 208 of Siemens, includes a diode D13, e.g., of the type designed IN4004, serving to protect the coil B1.

The connector 7 of the first module MO1, which constitutes a negative output, is directly coupled to the connector 12 of the second module MO2 forming part of the integrated circuit IC1. The connector 12 of the second module MO2 constitutes a negative input.

The connector 15 of the second module MO2 is coupled to the positive terminal TEF by means of an arrangement which includes a diode D6 and a timing unit comprising a capacitor C8 and a resistor R15. The diode D6 and resistor R15 are disposed in parallel and the connector 14 of the second module MO2 is coupled to the positive terminal TEF through the diode D6, on the one hand, and the resistor R15, on the other hand. The connector 11 of the second module MO2, which constitutes a positive input, is directly coupled to the positive terminal TEF and is therefore always at a high potential. As an illustration, the capacitor C8 may have a capacitance of 47 microfarads; the resistor R15 may have a resistance of 1 megohm; and the diode D6 may be of the type designated IN4148.

As indicated previously, the reset 13 of the second module MO2 is connected, via the diode D1, to the output 7 of the amplifier IC3' forming part of the checking circuit II. The connector 10 of the second module MO2, which constitutes a positive output, is coupled to the base of a transistor T2 by means of a diode D11 and a resistor R21. The base of the transistor T2 is grounded through a resistor R22. By way of example, the resistors R21 and R22 may have respective resistances of 1 and 10 kilohms; the diode D11 may be of the type designated IN4001; and the transistor T2 may be of the type designated PN 2222.

The emitter of the transistor T2 is connected to ground whereas the collector is connected to the negative terminal of the coil B2 forming part of the relay RE2 which controls the switch I2. The positive terminal of the coil B2 is connected to the positive terminal TPB of the vehicle battery. The relay RE2 which may, for instance, be constituted by a relay A 208 of Siemens, includes a diode D14, e.g., of the type designated IN4004, serving to protect the coil B2.

The connector 9 of the second module MO2, which constitutes a negative output, is coupled to the connector 4 of the third module MO3 forming part of the integrated circuit IC2. The connector 4 of the third module MO3 constitutes a negative input. A timing unit comprising an electrolytic capacitor C11 and a resistor R16 is interposed between the connector 9 of the second module MO2 and the connector 4 of the third module MO3. As an illustration, the capacitor C11 may have a capacitance of 10 microfarads and the resistor R16 may have a resistance of 22 kilohms.

The connector 1 of the third module MO3 is coupled to the positive terminal TEF by means of an arrangement which includes a diode D7 and a timing unit comprising a capacitor C9 and a resistor R17. The diode D7 and resistor R17 are disposed in parallel and the connector 2 of the third module MO3 is coupled to the positive terminal TEF through the diode D7, on the one hand, and the resistor R17, on the other hand. The connector 3 of the third module MO3, which constitutes a reset, and the connector 5 of the third module MO3, which constitutes a positive input, are both directly coupled to the positive terminal TEF and, hence, are always at a high potential. The connector 6 of the third module MO3 is coupled to the reset 13 of the fourth module MO4 via a diode D3 and is further coupled, by means of a diode D10 and the resistors R21, R22, to the base of the transistor T2 to thereby control the coil B2. By way of example, the capacitor C9 may have a capacitance of 10 microfarads; the resistor R17 may have a resistance of 10 kilohms; and the diodes D3, D7 and D10 may respectively be of the types designated IN4148, IN4148 and IN4001.

The connector 7 of the third module MO3, which constitutes a negative output, is directly coupled to the connector 12 of the fourth module MO4 forming part of the integrated circuit IC2. The connector 12 of the fourth module MO4 constitutes a negative input.

The connector 15 of the fourth module MO4 is coupled to the positive terminal TEF by means of an arrangement which includes a diode D8 and a timing unit comprising a capacitor C10 and a resistor R18. The diode D8 and resistor R18 are disposed in parallel and the connector 14 of the fourth module MO4 is coupled to the positive terminal TEF through the diode D8, on the one hand, and the resistor R18, on the other hand. The connector 11 of the fourth module MO4, which constitutes a positive input, is directly coupled to the positive terminal TEF and, accordingly, is always at a high potential. As an illustration, the capacitor C10 may have a capacitance of 47 microfarads; the resistor R18 may have a resistance of 1 megohm; and the diode D8 may be of the type designated IN4148.

The connector 10 of the fourth module MO4 is coupled to the base of the transistor T1 through a diode D9, e.g., of the type designated IN4001, and the resistors R19,R20. The connector 9 of the fourth module MO4 is not used.

The roof closing device according to the invention operates as follows:

When the security system is activated, that is, brought from its inoperative condition into its operative condition, the security system causes the terminal TAF of the conductor LAF to be brought to a low potential. As a result, the entire roof closing device is grounded through the negative terminal TEM and a high-intensity pulse is transmitted to the negative input 4 of the first module MO1 of the control circuit I. Since the reset 3 of the first module MO1 is always at a high potential, the positive output 6 of the first module MO1 emits a very short positive output signal. The duration of this positive output signal is determined by the timing unit C7,R14 and may, for example, be of the order of 500 milliseconds. The signal emitted by the positive output 6 of the first module MO1 acts on the transistor T1 to thereby excite the coil B1 of the relay RE1. The relay RE1, in turn, actuates the switch I1 so that the supply line LM1 for the motor M is connected to the conductor LSB which leads to the positive terminal TBP of the vehicle battery. Consequently, the motor M receives a very short positive pulse IM1 via the conductor LSB. The duration of the pulse IM1 for the motor M equals that of the signal emitted by the positive output 6 of the first module MO1. The shaft of the motor M rotates for the duration of the pulse IM1 coming from the conductor LSB and the direction of rotation is the same as that when the manually controlled key or button A is depressed.

Upon termination of the signal from the positive output 6 of the first module MO1, the motor M stops. The negative output 7 of the first module MO1 transmits a negative signal to the negative input 12 of the second module MO2 and, as a consequence, the second module MO2 emits a long positive output signal via its positive output 10 once the signal from the positive output 6 of the first module MO1 has ceased. The signal from the positive output 10 of the second module MO2 acts on the transistor T2 to thereby excite the coil B2 of the relay RE2. The relay RE2, in turn, actuates the switch I2 so that the supply line LM2 for the motor M is connected to the conductor LSB which leads to the positive terminal TPB of the vehicle battery. Accordingly, the motor M receives a long positive pulse IM2 through the conductor LSB. The duration of the pulse IM2 for the motor M equals that of the signal emitted by the positive output 10 of the second module MO2. The shaft of the motor M rotates for the duration of the pulse IM2 coming from the conductor LSB. The direction of rotation is opposite to that during the previous pulse IM1 and the same as that when the manually controlled key or button B is depressed.

The motor M draws a current in excess of a predetermined value when the motor M runs and the roof is between its fully closed position and either of its fully open positions. The current drawn by the motor M results in a certain voltage drop across the shunt resistor RS. This voltage drop causes the voltage at the negative input 2 of the amplifier IC3' to decrease so that a voltage differential in excess of a predetermined magnitude develops between the negative input 2 and positive input 3 of the amplifier IC3'. Due to this voltage differential, the output 1 of the amplifier IC3' emits a positive output signal. The signal from the output 1 of the amplifier IC3' generates a positive input voltage at the positive input 5 of the amplifier IC3'. When the voltage at the positive input 5 of the amplifier IC3" exceeds the reference voltage at the negative input 6 of such amplifier, the output 7 of the amplifier IC3" issues a positive output signal.

In addition to acting on the transistor T1, the output signal from the positive output 6 of the first module MO1 is transmitted to the reset 13 of the second module MO2 via the diode D2. As a result, the reset 13 of the second module MO2 is brought to a high potential. Once the reset 13 of the second module MO2 has been brought to a high potential by the signal from the positive output 6 of the first module MO1, the capacitor C3 discharges to thereby keep the potential at the reset 13 of the second module MO2 high. Furthermore, subsequent to discharge of the capacitor C3, the output signal from the output 7 of the amplifier IC3" operates on the reset 13 of the second module MO2 through the diode D1 and thus continues to maintain this reset at a high potential. On the one hand, the positive output 10 of the second module MO2 sends a signal to the transistor T2 as long as the reset 13 of the second module MO2 remains at a high potential. On the other hand, the output 7 of the amplifier IC3" maintains the reset 13 of the second module MO2 at a high potential as long as the motor M is running and the roof is neither fully closed nor fully open so that the motor M draws a current in excess of the predetermined value. Accordingly, when the roof is between its fully closed and either of its fully open positions, the transistor T2 excites the relay RE2 which, in turn, actuates the switch I2 to thereby maintain a connection between the conductor LSB and the supply line LM2 for the motor M. The motor M continues to receive the pulse IM2 while such connection is maintained.

When the roof reaches one of its terminal or end positions, that is, the fully closed position or either fully open position, the motor M stops and the current drawn by the motor M drops below the predetermined value. Consequently, the voltage drop across the shunt resistor RS decreases which, in turn, causes the voltage differential between the negative input 2 and the positive input 3 of the amplifier IC3' to drop below the predetermined magnitude, e.g., to drop to zero. The voltage at the positive input 5 of the amplifier IC3" then falls below the reference voltage at the negative input 6 of such amplifier so that the positive output signal from the output 7 of the amplifier IC3" is terminated. The potential at the reset 13 of the second module MO2 is accordingly reduced and the latter stops functioning to generate a signal at the positive output 10 thereof. Hence, the supply line LM2 for the motor M is disconnected from the conductor LSB leading to the positive terminal TPB of the vehicle battery and the long positive pulse IM2 delivered to the motor M ceases.

The time required for the motor M to move the roof between its fully closed position and either of its fully open positions may, for example, be 5 seconds. The timing unit comprising the capacitor C8 and the resistor R15 is designed in such a manner that, if the duration of the pulse IM2 were determined by this timing unit, the pulse IM2 would last for a time at least equal to, and preferably much greater than, the time which it takes for the roof to move between its fully closed position and either of its fully open positions. For instance, the timing unit comprising the capacitor C8 and the resistor R15 might be designed to generate a pulse lasting 25 seconds. However, the duration of the pulse IM2 is determined by the checking circuit II in dependence upon the distance actually traveled by the roof.

Immediately upon termination of the positive output signal from the positive output 10 of the second module MO2, the second module MO2 emits a negative output signal via the negative output 9 thereof. After a delay determined by the timing unit comprising the capacitor 11 and the resistor R16, the signal from the negative output 9 of the second module MO2 is allowed to pass to the negative input 4 of the third module MO3. The arrival of this signal at the negative input 4 of the third module MO3 causes the positive output 6 of the third module MO3 to emit a very short positive output signal. The duration of the signal issued by the positive output 6 of the third module MO3 is determined by the timing unit comprising the capacitor C9 and the resistor R17 and is preferably the same as the duration of the signal produced at the positive output 6 of the first module MO1, i.e., the signal duration established by the timing unit C9,R17 of the third module MO3 preferably equals that established by the timing unit C7,R14 of the first module MO1. The duration of the signal emitted by the positive output 6 of the third module MO3 or the first module MO1 may, for instance, be 500 milliseconds. The signal generated at the positive output 6 of the third module MO3 acts on the transistor T2 so that the relay RE2 is excited once more. The relay RE2, in turn, again actuates the switch I2 thereby causing the motor M to be subjected to a third positive pulse IM3 via the supply line LM2. The pulse IM3 has the same effect as, but is much shorter than, the preceding pulse IM2. Thus, the duration of the pulse IM3 is the same as that of the signal emitted by the positive output 6 of the third module MO3.

Upon termination of the pulse IM3, the negative output 7 of the third module MO3 sends a negative signal to the negative input 12 of the fourth module MO4. The signal arriving at the negative input 12 of the fourth module MO4 causes the positive output 10 of the fourth module MO4 to issue a long positive output signal which acts on the transistor T1 to thereby again excite the relay RE1. The relay RE1, in turn, once more actuates the switch I1 so that the motor M receives a fourth positive pulse IM4 via the supply line LM1. Consequently, the motor M operates again. The direction of rotation of the motor shaft during the fourth pulse IM4 is the same as that during the first pulse IM1 but counter to that during the second pulse IM2 and the third pulse IM3.

In addition to acting on the transistor T2, the output signal from the positive output 6 of the third module MO3 is transmitted to the reset 13 of the fourth module MO4 via the diode D3. As a result, the reset 13 of the fourth module MO4 is brought to a high potential. Once the reset 13 of the fourth module MO4 has been brought to a high potential by the signal from the positive output 6 of the third module MO3, the capacitor C3 discharges to thereby keep the potential at the reset 13 of the fourth module MO4 high. Furthermore, as long as the motor M is running and the roof is between its fully closed and fully open positions, the output 7 of the amplifier IC3' emits a positive output signal subsequent to discharge of the capacitor C3 for the reasons outlined previously. The output signal from the amplifier IC3' continues to maintain the reset 13 of the fourth module MO4 at a high potential while the roof is between its terminal or end positions. As long as the reset 13 of the fourth module MO4 is at a high potential, the relay RE1 causes the supply line LM1 for the motor M to be connected to the conductor LSB which delivers the pulse IM4 to the motor M.

When the roof reaches one of its terminal or end positions, the motor M stops and the current drawn by the motor M drops. As explained earlier, the signal from the output 7 of the amplifier IC3' is then terminated thereby causing the potential at the reset 13 of the fourth module MO4 to decrease. Consequently, the long positive pulse IM4 for the motor M is interrupted. Similarly the timing unit C8,R15 for the second module MO2, the timing unit C10,R18 associated with the fourth module MO4 is designed in such a manner that, if the duration of the pulse IM4 were determined by the timing unit C10,R18, the pulse IM4 would last for a time at least equal to, and preferably much greater than, the time required for the roof to move between its fully closed position and either of its fully open positions. However, as is the case for the pulse IM2 generated by the action of the second module MO2, the duration of the pulse IM4 is determined by the checking circuit II in dependence upon the distance actually traveled by the roof. Advantageously, the timing unit C8,R15 for the second module MO2 and the timing unit C10,R18 for the fourth module MO4 are designed to act for identical durations.

FIG. 3 illustrates the voltage, V, in the conductor LAF over a period beginning prior to activation of the security system and ending subsequent to termination of the last pulse IM4; the voltage, V, in the supply lines LM1 and LM2 over the same period; and the current, A, drawn by the motor M and passing through the shunt resistor RS during this period. It will be observed that the voltage, V, in the conductor LAF drops and becomes negative when the security system is brought into its operative condition.

The plot for the supply line LM1 includes two voltage pulses which respectively correspond to the short first pulse IM1 and the long fourth pulse IM4. On the other hand, the plot for the supply line LM2 includes a pair of voltage pulses respectively corresponding to the long second pulse IM2 and the short third pulse IM3. The long pulses IM2 and IM4, and the corresponding portions of the plot for the shunt resistor RS, are shown by broken lines because the durations of the pulses IM2 and IM4 depend upon the initial position of the roof.

As seen in FIG. 3, there is a delay between the end of the first pulse IM1 and the beginning of the second pulse IM2; between the end of the second pulse IM2 and the beginning of the third pulse IM3; and between the end of the third pulse IM3 and the beginning of the fourth pulse IM4. The delay between the end of the first pulse IM1 and the beginning of the second pulse IM2 is determined by the characteristics of the integrated circuit IC1 while the delay between the end of the third pulse IM3 and the beginning of the fourth pulse IM4 is determined by the characteristics of the integrated circuit IC2, i.e., the integrated circuit IC1 comprises means for spacing the first and second pulses IM1,IM2 and the integrated circuit IC2 comprises means for spacing the third and fourth pulses IM3,IM4. The delay between the end of the second pulse IM2 and the beginning of the third pulse IM3 is determined by the timing unit C11,R16.

As outlined above, the durations of the long second and fourth pulses IM2 and IM4 are determined by the checking circuit II. In contrast, the durations of the short first and third pulses IM3 and IM4 are not affected by the checking circuit II since the resets 3 of the first and third modules MO1 and MO3 are always kept at a high potential.

The sequence comprising the short first pulse IM1 which actuates the switch I1; the long second pulse IM2 which actuates the switch I2; the short third pulse IM3 which likewise actuates the switch I2; and the long fourth pulse IM4 which again actuates the switch I1 determines a cycle of movements differing in dependence upon the position of the roof when the security system is activated. However, regardless of the initial position of the roof, this sequence always has the effect of placing the roof in its fully closed position.

Assume that the roof is already in its fully closed position when the security system is activated. Based upon the earlier description of the functions of the keys or buttons A and B and the corresponding sets of switches IA,I1 and IB,I2, the short first pulse IM1 which actuates the switch I1 begins to open the roof by rotating the same from the closed position. In the fully closed position of the roof, the key or button B and switches IB,I2 serve to open the roof by translation. However, this function is changed upon opening of the roof by rotation so that the key or button B and switches IB,I2 now cause the roof to close by rotation. Hence, the second pulse IM2 which actuates the switch I2 results in closing of the roof. Since the first pulse IM1 was very short, e.g., 500 milliseconds, closing of the roof by the second pulse takes place within a very short period. Once the roof closes, the key or button B and switches IB,I2 assume their original function of opening the roof by translation. Thus, the short third pulse IM3 which again actuates the switch I2 begins to open the roof by translation. The key or button A and switches IA,I1, which serve to open the roof by rotation when the latter is in its closed position, become operative to close the roof by translation once the roof has been translated from the closed position. Accordingly, the fourth pulse IM4 which actuates the switch I1 causes the roof to close completely. Closing of the roof by the fourth pulse IM4 occurs within a very short period inasmuch as the third pulse IM3 was very short, e.g., 500 milliseconds.

Assume now that the roof is translated from its closed position at the time that the security system is activated. The short first pulse IM1 which actuates the switch I1 then begins to close the roof since the key or button A and switches IA,I1, which operate to open the roof by rotation when the roof is closed, serve to close the roof by translation after the roof has been translated from its closed position. The key or button B and switches IB,I2, which cause the roof to open by translation when the roof is closed, retain this function upon translation of the roof from its closed position. Therefore, the second pulse IM2 which actuates the switch I2 operates to move the roof to the fully open translated position. The short third pulse IM3 which once more actuates the switch I2 has essentially no effect as it tends to open the roof by translation. On the other hand, the fourth pulse IM4 which actuates the switch I1 causes the roof to close completely.

Assume next that the roof is rotated from its closed position upon activation of the security system. Since the key or button A and switches IA,I1, which serve to open the roof by rotation when the latter is in its closed position, retain this function as the roof rotates open, the short first pulse IM1 which actuates the switch I1 rotates the roof farther open if the roof is initially only partially open and has no effect if the roof is initially fully open. In contrast to the key or button A and the switches IA,I1, the key or button B and switches IB,I2, which operate to open the roof by translation when the roof is closed, assume the function of closing the roof once the roof has been rotated from the closed position. Thus, the second pulse IM2, which actuates the switch I2, results in closing of the roof. Upon closing of the roof, the key or button B and switches IB,I2 reassume the function of opening the roof by translation. Accordingly, the short third pulse IM3, which again actuates the switch I2, causes the roof to begin reopening by translation. However, the key or button A and switches IA,I1, which operate to open the roof by rotation when the roof is closed, become effective to close the roof by translation after the latter has been translated from its closed position. Hence, the fourth pulse IM4 which actuates the switch I1 closes the roof completely. Inasmuch as the third pulse IM3 is very short, e.g., 500 milliseconds, so that the roof only opens slightly in response to such pulse, the fourth pulse IM4 is likewise very short.

Although the second and fourth pulses IM2 and IM4 are referred to herein as long pulses, it is apparent from the preceding description that these pulses may, but need not necessarily, be of long duration.

The sequence outlined above for the four pulses IM1,IM2,IM3 and IM4 would result in complete closing of the roof even if the function of the set of elements A,IA,I1 when the roof is closed were exchanged for that of the set of elements B,IB,I2, and vice versa. However, the sequence of movements of the roof when translated from the closed position upon activation of the security system would then correspond to the sequence of movements which the roof undergoes in the previous example when rotated from the closed position; the sequence of movements when the roof is rotated from the closed position would correspond to the sequence of movements which the roof undergoes in the previous example when translated from the closed position; and, if the roof is closed upon activation of the security system, the roof would now open and close by translation and subsequently open and close by rotation rather than first opening and closing by rotation as in the previous example.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A vehicle, comprising a power roof having a closed position, a first open position in which said roof is translated from said closed position and a second open position in which said roof is rotated from said closed position; an electric motor for moving said roof between said positions; a source of electricity for said motor; means for securing said vehicle against theft, said securing means having an operative condition and an inoperative condition; and means for connecting said motor to said source, said connecting means including circuit means coupled to said motor and said source, first switch means for closing said circuit means and second switch means for closing said circuit means, said motor being designed to translate said roof towards said first open position when said first switch means is closed while said roof is in said closed position, and said motor further being designed to rotate said roof towards said closed position when said first switch means is closed while said roof is in said second open position, said motor also being designed to rotate said roof towards said second open position when said second switch means is closed while said roof is in said closed position, and said motor additionally being designed to translate said roof towards said closed position when said second switch means is closed while said roof is in said first open position, said circuit means being operable to actuate said switch means in response to a change from the inoperative to the operative condition of said securing means such that said motor locks said roof in said closed position.

2. The vehicle of claim 1, further comprising a first manually operable button and a second manually operable button; and wherein said first switch means includes a switch responsive to said first button and said second switch means includes a switch responsive to said second button.

3. The vehicle of claim 1, wherein said circuit means comprises an electronic circuit.

4. The vehicle of claim 1, wherein said circuit means is designed to emit four pulses in response to a change from the inoperative to the operative condition of said securing means, said pulses actuating said switch means such that said motor locks said roof in said closed position.

5. The vehicle of claim 4, wherein said circuit means comprises a control circuit designed to generate said pulses, said control circuit being arranged to actuate each of said switch means with two of said pulses.

6. The vehicle of claim 5, wherein said control unit is designed to generate said pulses in a predetermined sequence and said circuit means is designed such that the first and third pulses in said sequence are of no longer duration than the second and fourth pulses.

7. The vehicle of claim 6, wherein said control unit is arranged to actuate one of said switch means with said first and fourth pulses and the other of said switch means with said second and third pulses.

8. The vehicle of claim 7, wherein said roof has terminal first and second open positions and said circuit means further comprises a checking circuit designed to interrupt said second and fourth pulses when said roof assumes said closed position or either of said terminal positions.

9. The vehicle of claim 8, wherein said control circuit and said checking circuit are electronic.

10. The vehicle of claim 7, wherein said roof has terminal first and second open positions and said circuit means is designed such that the maximum possible duration of said second and fourth pulses at least equals the time required for said roof to travel between said closed position and either of said terminal positions.

11. The vehicle of claim 1, wherein said circuit means comprises a first relay for closing one of said switch means, a second relay for closing the other of said switch means and a control circuit for activating said relays.

12. The vehicle of claim 11, wherein said control circuit is designed to successively activate said first and second relays for respective first and second intervals in response to a change from the inoperative to the operative condition of said securing means, and to thereafter successively reactivate said second and first relays for respective third and fourth intervals.

13. The vehicle of claim 12, wherein said circuit means comprises means for delaying activation of said second relay beyond the end of said first interval and for delaying reactivation of said first relay beyond the end of said third interval.

14. The vehicle of claim 13, wherein said circuit means is designed such that said first and third intervals are no longer than said second and fourth intervals.

15. The vehicle of claim 14, wherein said roof has terminal first and second open positions and said circuit means is designed such that the maximum possible duration of said second and fourth intervals at least equals the time required for said roof to travel between said closed position and either of said terminal positions.

16. The vehicle of claim 14, wherein said roof has terminal first and second open positions and said motor is designed to draw current in excess of a predetermined value during travel of said roof between said closed position and either of said terminal positions, said motor drawing current of at most said predetermined value when said roof assumes said closed position or either of said terminal positions, and said circuit means further including a checking circuit arranged to monitor the current drawn by said motor and to regulate said control circuit in dependence upon the current such that activation of said second relay for said second interval and reactivation of said first relay for said fourth interval are terminated when the current drawn by said motor drops to said predetermined value.

17. The vehicle of claim 11, wherein said control circuit comprises first, second, third and fourth control modules, said first module having a first input connected to said securing means and a pair of first outputs including one which is connected to said first relay, said second module having a second input connected to the other of said first outputs and a pair of second outputs including one which is connected to said second relay, said third module having a third input connected to the other of said second outputs and a pair of third outputs including one which is connected to said second relay, and said fourth module having a fourth input connected to the other of said third outputs and a fourth output connected to said first relay.

18. The vehicle of claim 17, wherein said circuit means further comprises a checking circuit arranged to monitor the current drawn by said motor, said second and fourth modules each having an additional input connected to said checking circuit.

19. The vehicle of claim 18, wherein said roof has terminal first and second open positions and said motor is designed to draw current in excess of a predetermined value during travel of said roof between said closed position and either of said terminal positions, said motor drawing current of at most said predetermined value when said roof assumes said closed position or either of said terminal positions, and said checking circuit being designed to generate an operating signal while the current drawn by said motor exceeds said predetermined value and to interrupt said operating signal when the current drops to said predetermined value, said securing means transmitting an activating signal to said first input in response to a change from the inoperative to the operative condition of said securing means, and said one first output emitting a first pulse in response to said activating signal, said other first output transmitting a first output signal to said second input in response to said activating signal, and said one second output emitting a second pulse of at least the same duration as said first pulse in response to said first output signal, said other second output transmitting a second output signal to said third input in response to said first output signal, and said one third output emitting a third pulse of no longer duration than said second pulse in response to said second output signal, said other third output transmitting a third output signal to said fourth input in response to said second output signal, and said fourth output emitting a fourth pulse of at least the same duration as said first and third pulses in response to said third output signal, said circuit means being designed such that the maximum possible duration of said second and fourth pulses at least equals the time required for said roof to travel between said closed position and either of said terminal positions, and said circuit means further being designed to terminate said second and fourth pulses in response to interruption of said operating signal.

20. The vehicle of claim 19, wherein said circuit means comprises means for spacing said pulses.

21. The vehicle of claim 1, comprising at least one door; and wherein said securing means comprises means for locking said door.

22. The vehicle of claim 1, comprising an ignition mechanism; and wherein said securing means comprises means for locking said mechanism.

23. The vehicle of claim 1, wherein said securing means comprises an alarm system.

24. A vehicle, comprising a power roof having a closed position and an open position; an electric motor for moving said roof between said positions; a source of electricity for said motor; means for securing said vehicle against theft, said securing means having an operative condition and an inoperative condition; and means for connecting said motor to said source, said connecting means including circuit means coupled to said motor and said source, and switch means for closing said circuit means, said motor being designed to move said roof when said switch means is closed, and said circuit means being operable to actuate said switch means in response to a change from the inoperative to the operative condition of said securing means such that said motor locks said roof in said closed position.

* * * * *